United States Patent Office 3,806,419
Patented Apr. 23, 1974

3,806,419
PREPARING PULLULANASE ENZYME
Robert Edward Heady, Park Forest, Ill., assignor to CPC International Inc.
No Drawing. Continuation-in-part of abandoned application Ser. No. 775,520, Nov. 13, 1968. This application Mar. 10, 1972, Ser. No. 234,440
Int. Cl. C07g 7/02
U.S. Cl. 195—66 R
11 Claims

ABSTRACT OF THE DISCLOSURE

A method for making a pullulanase enzyme preparation. The method involves making a pullulanase enzyme preparation from the *Aerobacter aerogenes* bacterium by providing as a carbohydrate source either a starch or a low D.E. starch hydrolysate in either the culture maintenance step or the inoculum development stage.

---

This application is a continuation-in-part of copending application Ser. No. 775,520, filed Nov. 13, 1968, and now abandoned.

Pullulanase enzyme is a particularly valuable enzyme due to the fact that it specifically cleaves the alpha-1–6 linkages in starches. This particular enzyme is produced by the bacterium *Aerobacter aerogenes*. When the pullulanase enzyme is used in conjunction with a maltose producing enzyme such as a malt diastase, starches can be easily converted to syrups of a higher maltose composition which is unattainable when the starches are converted with malt diastase alone. These improved higher maltose syrups have special utility in many food applications.

In prior art descriptions of the preparation of the pullulanase enzyme it has been particularly pointed out that best results are obtained by inducing the formation of the enzyme with maltose, maltotriose, or pullulan, at least in the fermentation step and preferably in the inoculum and fermentation steps. Pullulan is a polysaccharide produced by the black yeast *Pullularia pullulans*. Its structure is in reality a polymer of maltotriose connected by alpha-1–6 linkages. Maltose is said to be the superior carbohydrate source for production of the pullulanase enzyme.

However, it is known that yields of the pullulanase enzyme are not nearly as high as are desired even when the most effective carbohydrate source known, maltose, is utilized. This makes overall production of this valuable enzyme preparation costly, and thus its commercial utilization has not been realized in most instances, even though the starch hydrolysate products produced through use of this enzyme have proved to have special properties and values in a number of food applications.

It therefore becomes an object of the invention to provide an improved method of making a pullulanase enzyme preparation.

Another object of the invention is to provide a method of making pullulanase enzyme in exceptionally high yields at low cost.

A still further object of the invention is to provide a method of producing pullulanase enzyme in a facile and economical manner by utilization of a carbohydrate source in either the culture maintenance and the inoculum development steps of the enzyme production procedure whereby an overall materially increased enzyme yield is obtained.

Other objects will appear hereinafter.

In accordance with the invention we have discovered a unique method of producing pullulanase enzyme in materially enhanced yields compared to prior art processes. In its broadest aspects the method of the invention comprises the step of providing as a carbohydrate source a starch or low D.E. starch hydrolysate in one or more of the aforementioned stages. The stages involved include that of culture maintenance and inoculum development.

Fermentation processes as used in production of enzymes by microorganisms generally proceeds through the stages of (A) culture maintenance, (B) inoculum development, and (C) final fermentation. Generally, in stage (A) the culture is maintained or preserved on agar slants, with periodic transfer to maintain viability. In the inoculum development (stage B), the culture is transferred from stage (A) to a liquid culture medium in order to provide an active culture in sufficient volume to inoculate the final production medium. Stage (B) may consist of a single transfer to the liquid medium or may include several successive transfers as required to provide for activation of the culture or to build sufficient volume for inoculation of final production medium. The final fermentation (stage C) is inoculated with the culture resulting from the final transfer of stage (B), and is the stage in which the desired enzyme is produced for use, either directly as the liquid culture or filtrate, or after further processing or purification.

As mentioned above, the pullulanase enzyme yield can be substantially increased by having present as a carbohydrate source starch or a low D.E. starch hydrolysate in either (A) culture maintenance or (B) inoculum development. In like manner, we have found that the pullulanase enzyme yield is even further increased by utilization of the starch or starch hydrolysate carbohydrate source in both the above stages of the enzyme development as compared to utilization in only one stage. That is, we have found that increased yields of pullulanase enzyme can be realized if a source of starch or starch hydrolysate is utilized as a carbohydrate source in either one of the stages of culture maintenance or inoculum development. Likewise, if a starch or low D.E. starch hydrolysate carbohydrate source is utilized in both these steps or stages, the enzyme yield is increased even further compared to utilization of the starch or starch hydrolysate in only one stage.

Lastly, we have found that via use of starch or starch hydrolysate in all three of the steps involved in the fermentative preparation of pullulanase enzyme, highest enzyme yields can be obtained. Such was entirely unexpected in view of previous recommendations on types of media suggested for pullulanase production.

In fact, it has been discovered that by substituting starch or starch hydrolysate for maltose in either of the two conventional stages, (A) and (B) above, of enzyme preparation, an increased yield of the pullulanase enzyme is realized. This is despite statements of the literature that for best yields, maltose must be utilized as the carbohydrate source, particularly at least in the fermentation or enzyme production step and preferably in both the inoculum and fermentation stages. In essence, we have found that use of the starch or starch hydrolysate in either the inoculum or fermentation stages or in both stages of the pullulanase enzyme preparation is far superior to like use of maltose in either or both of these stages.

We have further discovered that replacement of glucose, normally used in the culture maintenance step, with starch or a starch hydrolysate likewise results in greatly enhanced yields of the desired pullulanase enzyme.

The first step in making the desired pullulanase enzyme preparation is, of course, actually maintaining the desired enzyme producing culture in some medium. In the culture maintenance step one merely maintains the bacterium. The culture is maintained on a slant in the normal manner, usually on an agar medium. As noted above, it has been discovered here that if starch or a low D.E. starch hydrolysate is employed in the culture maintenance step, one realizes increased yields of the enzyme in the fermentation stage, even if starch or a low D.E. starch hydrolysate is not employed in the subsequent two steps. This is true even if, for example, one employs maltose or some other carbohydrate source in the inoculum and/ or the fermentation steps.

Characteristics by which members of the species *Aerobacter aerogenes* may be distinguished are described by M. W. Yale et al., in "Bergey's Manual of Determinative Bacteriology," 7th ed., pp. 341–42, 1957 (Williams & Wilkins Company, Baltimore), although it is well recognized by those skilled in the art that mutant strains may be isolated from time to time which do not completely conform to this identical description.

Cultures of *Aerobacter aerogenes* that may be used in the practice of this invention may be obtained from the American Type Culture Collection, 12301 Parklawn Drive, Rockville, Md. One typical culture used here is designated under the accession number ATCC 9621. However, as will be shown below, the process of the invention is not strain specific. That is, the increase in pullulanase enzyme through use of starch or starch hydrolysates in any one or more of the three steps of culture maintenance, inoculum development and enzyme production is realized even when the strains of *Aerobacter aerogenes* other than ATCC 9621 are used.

In the step of maintaining the culture, ½–2% of starch or starch hydrolysate is employed as a carbohydrate source. The most preferred carbohydrate source in this particular step is starch.

A medium useful to maintain the culture on agar slants has the following composition:

| | Percent |
|---|---|
| Difco bacto-peptone | 1.0 |
| Difco yeast extract | 0.1 |
| Dibasic potassium phosphate | 0.1 |
| Starch or starch hydrolysate carbohydrate source | 1.0 |
| Agar | 1.6 |

The next step involved in making the pullulanase enzyme is the inoculum development step. Here, the culture inoculum is obtained by aseptically transferring from the above described agar slants or other suitable culture medium, cells of a pure culture of the microorganism *Aerobacter aerogenes* into a flask containing sterile medium having the following composition:

| | Percent |
|---|---|
| Difco bacto-peptone | 1.0 |
| Difco yeast extract | 0.1 |
| Dibasic potassium phosphate | 0.1 |
| Starch or starch hydrolysate carbohydrate source | 1.0 |

In a typical run, growth is allowed to develop under aerobic conditions for 20 hours. An inoculum, for example 5% of this culture, is then transferred to a second inoculum flask or fermenter containing the same medium composition, and growth allowed to develop for 6 additional hours also under aerobic conditions.

The final stage of the process of the invention is the fermentation step in which enzyme is actually produced. A typical fermentation medium of the invention has the following composition:

| | Percent |
|---|---|
| Difco bacto-peptone | 2.5 |
| Difco yeast extract | 2.0 |
| Diammonium sulfate | 0.66 |
| Starch hydrolysate carbohydrate source | 2.0 |

In a typical shake-flask run the final fermentation stage received 5% inoculum based on the volume of medium in fermentation flask. Fermentations were then conducted in Hinton modified 1 liter Erlenmeyer flask containing 200 ml. of medium. Aeration and agitation was obtained by using a Gump rotary shaker operating at 225 r.p.m. The fermentation temperature was 28–30° C. Generally the fermentation time was about 72 hours.

Again, just as in the culture maintenance and inoculum development stages, the use of starch or starch hydrolysate in the fermentation step resulted in an increase in enzyme yield, even if another carbohydrate source was employed in the first two steps. Thus, through use of starch or starch hydrolysate in any stage, one can realize increase in enzyme yield. Use of the same carbohydrate source in any two of the three stages results in even greater enzyme yields. Maximum enzyme yield is obtained if a starch or starch hydrolysate is used as a carbohydrate source in all three stages of the fermentation process for enzyme production.

The most preferred carbohydrate source in both the inoculum development and fermentation stages is a low D.E. starch hydrolysate, through increased enzyme yields result even if the hydrolysate is used only in the culture maintenance stage. Greatly preferred starch hydrolysates are those having a D.E. less than 40 and most preferably having a D.E. falling within the range of from about 5 to about 25.

In one desires, after the fermentation step a concentrated dried preparation of pullulanase enzyme may be obtained. A typical procedure is as follows:

1500 milliliters of chilled (4° C.) acetone is added to 1 liter of chilled (4° C.) cell-free culture liquor containing 10 grams of diatomaceous earth. After complete mixing the suspension is vacuum filtered to recover the insolubilized enzyme. Upon completion of filtration, the filter cake is recovered, spread, and allowed to dry overnight at room temperature. Once the filter cake is dried it is assayed for pullulanase enzyme activity.

The level of pullulanase enzyme activity present in pullulanase preparations after the fermentation is completed may be determined as follows:

A sample of enzyme solution is adjusted to pH 5.5, appropriately diluted and a 1.0 milliliter aliquot added to a digestion mixture composed of 2 milliliters of a 5% pullulan solution and 7 milliliters of a M/50 phosphate buffer, pH 5.5. The reaction is carried out in test tubes placed in a 40° C. waterbath and is allowed to proceed for 1 hour. At the end of the digestion period, the reaction is stopped by the addition of hydrochloric acid to lower the pH to 3.0. The reducing sugar content of the digestion mixture is determined as well as that of the culture liquor and pullulan used, by a modification of the alkaline potassium ferricyanide method described hereinafter and is expressed as microgram equivalents of dextrose. Pullulanase enzyme activity is calculated as follows:

$$A = \frac{T-(C+P)}{180 \times 60} \times D$$

where $A$ = Pullulanase enzyme activity, units per milliliter or gram of enzyme preparation.

$T$ = Total reducing sugars in digestion mixture in micrograms, calculated as dextrose.

$C$ = Residual reducing sugars in culture liquor in micrograms, calculated as dextrose.

$P$ = Reducing value of the pullulan polysaccharide used in the digestion mixture in micrograms, calculated as dextrose.

$D$ = Dilution factor of enzyme preparation.

180 = Reducing value of 1 micromole of dextrose.

60 = Time (minutes) of reaction.

One unit of pullulanase is defined as the amount of enzyme required to produce 180 micrograms of reducing sugars, calculated as dextrose, per minute from pullulan under the conditions specified above.

The polysaccharide, pullulan, which is a polymer of maltotriose units connected to each other by alpha-1–6 linkages, may be obtained from *Pullularie pullulans* ATCC 9348 by use of the procedure of S. Ueda, F. Fujita, K. Komatsu, and Z. Nakashima which appeared in "Applied Microbiology," 11, 211–215 (1963).

The modified potassium ferricyanide assay procedure used for determination of reducing agents in assaying enzyme preparation is conducted as follows:

Reagents.—Alkaline ferricyanide: Dissolve 1.170 g. of potassium ferricyanide and 19.5 g. of anhydrous sodium carbonate in water and dilute to 1 liter. Store in amber bottle. Standard dextrose solution, 0.1 mg./ml.: Weight 1.000 g. of pure anhydrous dextrose and dilute to 100 ml. Using a class A pipette, transfer 10.0 ml. of the solution to a 1 liter flask and dilute to mark.

Procedure.—Standardization: Pipette 0.5-, 1.0-, 1.5-, 2.0-, and 2.5-ml. aliquots of standard dextrose solution, 0.1 mg./ml., into respective 18-cm. test tubes. Then water is added in amounts to bring the total volume of the respective tubes to 2.5 ml. The reagent blank contains 2.5 ml. of water. To each tube is then added 5 ml. of the alkaline ferricyanide solution. The mixture is then heated in a boiling waterbath for exactly 5 minutes, cooled immediately in a waterbath, diluted to 12.5 ml. volume with water and mixed. Using water as reference solution at 0 absorbance, determine the absorbancy of the blank and of each of the standard tubes at 373 mu on a Beckman DU spectrophotometer, using 1-cm. cuvettes.

Analysis.—An aliquot of enzyme preparation is used which will produce from 1 to 10 mg. reducing sugars per 10 ml. digestion mixture. The sample of the digestion mixture assayed by this method will contain from 50 to 250 micrograms of reducing sugar.

Calculation.—Plot absorbances of standard tubes corrected for blank versus micrograms of dextrose per 12.5 ml. on linear coordinate graph for standardization curve.

The starch which may be utilized here may be chosen from a wide variety of sources. Suitable starches include cereal starches such as corn, grain sorghum and wheat; waxy starches such as waxy milo and waxy maize; and root starches such as potato starch, tapioca starch. High amylose starches may also be used. Crude starch sources may also be used, such as ground cereals, macerated tubers or the partially purified starches therefrom.

The second class of carbohydrate materials which may be used in the invention is the low D.E. starch hydrolysate. These materials are made by subjecting a source of starch to enzyme or acid treatment or a combination of both treatments. As noted above, preferred starch hydrolysates have a relatively low D.E. of less than about 40, and most preferably have a D.E. falling within the range of from about 5 to about 25. Bacterial α-amylase is particularly useful in producing low D.E. hydrolysates of the desired composition by enzymatic means.

The term D.E. (dextrose equivalent) is used herein to refer to the reducing sugars content of the dissolved solids in a starch hydrolysate expressed as dextrose as measured by the Luff-Schoorl Method (NBS Circular C–440, p. 195 (1942) as appearing in "Polarimetry, Saccharimetry and the Sugars," authors: Frederick J. Bates and Assoc.).

The following examples illustrate the efficacy of the invention. The three stages of culture maintenance, inoculum development and fermentation are carried out as generally described above using conventional techniques. The pullulanase yield is expressed in units/ml. (units of active enzyme as calculated above per ml. of fermenter broth). Percentages are in terms of weight percentages. It is understood that these examples are illustrative only and that the invention is not limited thereto.

EXAMPLE I

Here, glucose normally used in maintaining the *Aerobacter aerogenes* culture was replaced with corn starch.

*A. aerogenes* was maintained on slants of the following composition:

|  | Percent |
|---|---|
| Difco bacto-peptone | 1.0 |
| Difco yeast extract | 0.1 |
| Dibasic potassium phosphate | 0.1 |
| Corn starch or 0.5–1.0% glucose | 1.0 |

After 72 hours' growth on the slant at 28° C. a loopful of the cells was transferred under aseptic conditions into a 1 liter Erlenmeyer flask containing 200 ml. of sterile inoculum medium composed of:

|  | Percent |
|---|---|
| Difco bacto-peptone | 1.0 |
| Difco yeast extract | 0.1 |
| Dibasic potassium phosphate | 0.1 |
| Maltose | 1 |

After 20 hours' incubation at 28° C. on a rotary shaker, 10 ml. of inoculum was transferred to a second inoculum flask composed of the same medium. These flasks were then incubated for 6 hours under the same conditions. After this period of time, 10 ml. of each culture were transferred to a 1000 ml. Hinton-type Erlenmeyer flask containing 200 ml. of a sterilized fermentation medium of the following composition:

|  | Percent |
|---|---|
| Difco bacto-peptone | 2.5 |
| Difco yeast extract | 2.0 |
| Diammonium sulfate | 0.66 |
| Maltose | 2 |

The fermentation stage was conducted 72 hours at 28° C. on a rotary shaker.

Results are as follows in Table I. It can readily be seen that the amount of pullulanase enzyme was greatly increased in yield by utilizing corn starch as a carbohydrate source in the culture stage as compared to glucose.

TABLE I

| Culture stage | Inoculum stage | Fermentation stage | Pullulanase yield, units/ml. |
|---|---|---|---|
| 0.5% glucose | 1% maltose | 2% maltose | 4.0 |
| 1% glucose | do | do | .75 |
| 1% cornstarch | do | do | 10.3 |

EXAMPLE II

In this series of experiments a number of low D.E. starch hydrolysates were employed in the fermentation step replacing maltose generally employed according to the prior art. The procedure of Example I was followed. As is evident from Table II the yield of pullulanase enzyme was again greatly increased by the use of a starch hydrolysate source here compared to like use of maltose.

TABLE II

| Culture stage | Inoculum stage | Fermentation stage | Pullulanase yield, units/ml. |
|---|---|---|---|
| 0.5% glucose | 1% maltose | 2% maltose | 4.2 |
| Do | do | 2% 15 D.E. cornstarch hydrolysate | 7.6 |
| Do | do | 2% 16.5 D.E. cornstarch hydrolysate | 10.4 |
| Do | do | 2% 20 D.E. cornstarch hydrolysate | 8.6 |

EXAMPLE III

Here, a low D.E. starch hydrolysate was employed in the inoculum step. Again increased yields of pullulanase are noted compared to the conventional practice.

TABLE III

| Culture stage | Inoculum stage | Fermentation stage | Pullulanase yield units/ml. |
|---|---|---|---|
| 0.5% glucose | 1.0% maltose | 0.5% maltose | 0.69 |
| Do | do | 1.0% maltose | 0.65 |
| Do | do | 2.0% maltose | 0.68 |
| Do | 1.0% 15 D.E. cornstarch hydrolysate | 0.5% maltose | 5.0 |
| Do | do | 1.0% maltose | 3.5 |
| Do | do | 2.0% maltose | 4.6 |

EXAMPLE IV

Here, a starch source was employed in both the culture and inoculum stages and compared to the prior art method. As is clearly evident vastly increased amounts of pullulanase are realized. Likewise when a starch is used in both the culture and fermentation steps increased enzyme yields are noted. Lastly, when starch is used as a carbohydrate source in the inoculum and fermentation steps again one realizes increased pullulanase enzyme yields.

TABLE IV

| Culture stage | Inoculum stage | Fermentation stage | Pullulanase yield, units/ml. |
|---|---|---|---|
| 0.5% glucose | 1% maltose | 2% maltose | 4.0 |
| Do | 1% 15 D.E. cornstarch hydrolysate | 2% 15 D.E. cornstarch hydrolysate | 12.9 |
| 1.0% cornstarch | do | 2% maltose | 8.0 |
| Do | 1% maltose | 2% 15 D.E. cornstarch hydrolysate | 24.3 |

EXAMPLE V

Here, a starch or starch hydrolysate is used in all three stages. The highest amounts of pullulanase enzyme yield possible through use of the present invention were realized by utilizing this technique.

TABLE V

| Culture stage | Inoculum stage | Fermentation stage | Pullulanase yield, units/ml. |
|---|---|---|---|
| 1% cornstarch | 15 D.E. cornstarch hydrolysate | 15 D.E. cornstarch hydrolysate | 34.1 |
| 15 D.E. cornstarch hydrolysate | do | | 25.2 |

EXAMPLE VI

Here, a number of starch hydrolysates were used in the fermentation stage which had various D.E. values. As can be seen from Table VI below the low D.E. starch hydrolysate may be thus varied and yet one still produces superior yields of pullulanase enzyme.

TABLE VI

| Culture stage | Inoculum stage | Fermentation stage | Pullulanase yield, units/ml. |
|---|---|---|---|
| 1% cornstarch | 1% 10 D.E. cornstarch hydrolysate | 2% 5 D.E. cornstarch hydrolysate | 12.6 |
| Do | do | 2% 11.8 D.E. cornstarch hydrolysate | 22.2 |
| Do | | 2% 15 D.E. cornstarch hydrolysate | 22.0 |
| Do | do | 2% 20 D.E. cornstarch hydrolysate | 14.8 |
| Do | do | 2% 24 D.E. cornstarch hydrolysate | 18.3 |
| Do | do | 2% 29.5 D.E. cornstarch hydrolysate | 15.3 |
| Do | do | 2% 36 D.E. cornstarch hydrolysate | 13.0 |
| Do | do | 2% 42 D.E. cornstarch hydrolysate | 7.4 |

EXAMPLE VII

Again, a number of starch hydrolysates with various D.E. values were used. However, in this instance the various low D.E. starch hydrolysates were utilized in development of the inoculum rather than in the fermentation step as in Example VI. As is evident from Table VII good results in terms of pullulanase yield are realized regardless of the low D.E. starch hydrolysate utilized.

TABLE VII

| Culture stage | Inoculum stage | Fermentation stage | Pullulanase yield, units/ml. |
|---|---|---|---|
| 1% starch | 1% 5 D.E. cornstarch hydrolysate | 1% 15 D.E. cornstarch hydrolysate | 29.5 |
| Do | 1% 11.8 D.E. cornstarch hydrolysate | do | 32.6 |
| Do | 1% 15 D.E. cornstarch hydrolysate | do | 34.1 |
| Do | 1% 20 D.E. cornstarch hydrolysate | do | 34.1 |
| Do | 1% 24 D.E. cornstarch hydrolysate | do | 27.1 |
| Do | 1% 29.5 D.E. cornstarch hydrolysate | do | 31.6 |
| Do | 1% 36 D.E. cornstarch hydrolysate | do | 37.8 |
| Do | 1% 42 D.E. cornstarch hydrolysate | do | 32.5 |

EXAMPLE VIII

In this series of runs it was demonstrated that either starch or a starch hydrolysate may be used as a carbohydrate source in the culture maintenance step. In instances, excellent yields of pullulanase enzyme were realized.

TABLE VIII

| Culture stage | Inoculum stage | Fermentation stage | Pullulanase yield, units/ml. |
|---|---|---|---|
| 1% cornstarch | 1% 15 D.E. cornstarch hydrolysate | 2% 15 D.E. cornstarch hydrolysate | 34.1 |
| 1% 25 D.E. cornstarch hydrolysate | do | do | 25.2 |

EXAMPLE IX

This work demonstrated the fact that various types of starch sources of starch hydrolystates work equally well as carbohydrate sources in the production of the pullulanase enzyme.

TABLE IX

| Culture stage | Inoculum stage | Fermentation stage | Pullulanase yield, units/ml. |
|---|---|---|---|
| 1% 15 D.E. cornstarch hydrolysate | 1% 15 D.E. cornstarch hydrolysate | 1% 15 D.E. cornstarch hydrolysate | 16.7 |
| Do | do | 1% 12 D.E. waxy milo starch hydrolysate | 22.3 |
| Do | do | 1% 13 D.E. potato starch hydrolysate | 20.6 |

EXAMPLE X

Here, a starch or starch hydrolysate was used in either one, two or three stages of culture maintenance, inoculum development and fermentation. Results are as follows:

TABLE X

| Culture stage | Inoculum stage | Fermentation stage | Pullulanase yield, Units/ml. |
|---|---|---|---|
| 0.5% glucose | 1% maltose | 2% maltose | 4.2 |
| Do | do | 2% 15 D.E. cornstarch hydrolysate. | 7.6 |
| Do | do | 2% 16.5 D.E. waxy milo starch hydrolysate. | 10.4 |
| Do | do | 2% 20 D.E. waxy milo starch hydrolysate. | 8.6 |
| Do | 1% 5 D.E. cornstarch hydrolysate. | 2% 15 D.E. cornstarch hydrolysate. | 15.2 |
| Do | 1% 11.8 D.E. waxy milo starch hydrolysate. | do | 14.1 |
| Do | 1% 15 D.E. cornstarch hydrolysate. | do | 12.9 |
| Do | 1% 20 D.E. cornstarch hydrolysate. | do | 14.3 |
| 1% 11.8 D.E. waxy milo starch hydrolysate. | 1% 5 D.E. cornstarch hydrolysate. | do | 20.0 |
| 1% 25 D.E. cornstarch hydrolysate. | 1% 15 D.E. cornstarch hydrolysate. | do | 25.2 |
| 1% cornstarch | 1% 24 D.E. cornstarch hydrolysate. | do | 27.1 |

EXAMPLE XI

The following runs illustrate that a variety of low D.E. starch hydrolysates will serve to induce high yields of pullulanase whether they be prepared by acid or enzyme hydrolysis. These various low D.E. starch hydrolysates were used in the fermentation step. The culture was maintained on glucose and was developed using 15 D.E. corn starch as the carbohydrate source. The fermentation time here was 48 hours.

TABLE XI

| Starch hydrolysate | Prepared by— | Concentration, percent | Pullulanase yield, units/ml. |
|---|---|---|---|
| 10.8 D.E. cornstarch | Enzyme hydrolysis | 0.5 | 10.3 |
| Do | do | 1.0 | 21.0 |
| 15 D.E. cornstarch | Acid hydrolysis | 0.5 | 12.7 |
| Do | do | 1.0 | 10.8 |
| 12 D.E. waxy sorghum starch. | Enzyme hydrolysis | 0.5 | 11.7 |
| Do | do | 1.0 | 14.8 |
| 13.8 D.E. potato starch | do | 0.5 | 11.6 |
| Do | do | 1.0 | 17.2 |
| Maltose | | 0.5 | 3.8 |
| Do | | 1.0 | 5.8 |

EXAMPLE XII

The process of the invention is not strain specific. That is, the same phenomenon shown above in previous examples will also occur if a different strain of the microorganism *Aerobacter aerogenes*, other than the ATCC 9621 culture used in the previous examples, is employed.

Here, the culture employed was *Aerobacter aerogenes* ATCC 8724. Results in preparing pullulanase enzyme preparation using starch and starch hydrolysates as a carbohydrate source for this particular strain are shown below in Table XII. As is evident, pullulanase yield is increased using a starch carbohydrate source and is not particularly dependent upon the source of the *Aerobacter aerogenes* bacterium used to produce the desired enzyme.

TABLE XII

| Culture stage | Inoculum stage | Fermentation stage | Pullulanase yield, units/ml. |
|---|---|---|---|
| 0.5% glucose | 1% maltose | 2% maltose | 0.65 |
| 1% starch | do | 2% 15 D.E. starch hydrolysate. | 12.6 |
| Do | 1% 15 D.E. starch hydrolysate. | do | 12.3 |

EXAMPLE XIII

In this example a number of starch hydrolystates were analyzed as to their various components. These starches were produced both by enzyme and acid hydrolysis techniques.

As can be seen in Table XIII below, the amount of maltose in each sample is relatively small. Therefore, it is evident that the excellent effectiveness of the starch hydrolysates as culture media is not due to the maltose content present, as taught by the prior art.

TABLE XIII.—COMPOSITIONS OF STARCH HYDROLYSATES

| | | Percent dry basis of— | | | | | | | |
|---|---|---|---|---|---|---|---|---|---|
| Method of hydrolysis | DE | $DP_1$ (glucose) | $DP_2$ (maltose) | $DP_3$ (maltotriose) | $DP_4$ | $DP_5$ | $DP_6$ | $DP_7+$ | Percent [1] fermentables |
| Enzyme | 10 | 1 | 2 | 5 | 4 | 4 | 9 | 75 | 8 |
| | 15 | 1 | 4 | 8 | 5 | 6 | 18 | 58 | 13 |
| | 20 | 2 | 7 | 10 | 6 | 8 | 19 | 48 | 19 |
| | 25 | 3 | 10 | 12 | 7 | 11 | 16 | 41 | 25 |
| | 30 | 7 | 13 | 14 | 7 | 13 | 10 | 36 | 34 |
| Acid | 10 | 2 | 2 | 3 | 3 | 2 | 3 | 85 | 7 |
| | 15 | 3 | 4 | 4 | 5 | 4 | 4 | 76 | 11 |
| | 20 | 4 | 5 | 6 | 6 | 5 | 5 | 69 | 15 |
| | 30 | 10 | 9 | 9 | 8 | 8 | 7 | 49 | 28 |

[1] Total of $DP_1$, $DP_2$ and $DP_3$.

Note.—DP = Degree of polymerization.

EXAMPLE XIV

For ease of inspection and interpretation, the important features of the invention are summarized in Table XIV. The data presented in this table were extracted from Examples I to V as indicated.

Condition 1 is representative of prior art procedures in which glucose or maltose are used in all three fermentation stages, namely culture maintenance (A), inoculum development (B) and the final fermentation (C). Using starch in the culture stage results in an improved enzyme yield even with maltose in the fermentation stage (condition 2). Similar results art obtained when a low D.E. starch hydrolysate is used in the inoculum development stage (condition 3). Similarly, an improvement of enzyme yield is obtained when a starch or starch hydrolysate is used in both the A and B stages (condition 4).

The use of a low D.E. starch hydrolysate in the fermenation medium also results in improved enzyme production (condition 5). However, still further improvements in performance are obtained when starch or starch hydrolysates are also used in stages A or B (conditions 6 and 7) or in both stages (condition 8). Condition 9 shows that the use of low D.E. starch hydrolysates in the culture maintenance stage are similarly effective, even when they are used also in the inoculum development and fermentation stages. The other examples included in the application further define and clarify the scope of the invention. They show that low D.E. hydrolysates prepared over a broad D.E. range by different procedures and from various starch sources are all suitable for the process of this invention, and that the improvements obtained are not strain specific with regard to the pullulanase producing organism employed.

TABLE XIV

| Condition | See Ex. | Fermentation stage | | | Enzyme yield, units/ml. |
|---|---|---|---|---|---|
| | | Culture (A) | Inoculum (B) | Fermentation (C) | |
| 1 | I | Glucose | Maltose | Maltose | 4.0 |
| 2 | I | Starch | do | do | 10.3 |
| 3 | III | Glucose | 15 D.E. starch | do | 4.6 |
| 4 | IV | Starch | do | do | 8.0 |
| 5 | II | Glucose | Maltose | 15 D.E. starch | 7.6 |
| 6 | IV | Starch | do | do | 24.3 |
| 7 | IV | Glucose | 15 D.E. starch | do | 12.9 |
| 8 | V | Starch | do | do | 34.1 |
| 9 | V | 15 D.E. starch | do | do | 25.2 |

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. In a method of making a pullulanase enzyme preparation from the bacterium, *Aerobacter aerogenes*, said method comprising the stages of (a) culture maintenance, (b) inoculum development to provide an active culture of said bacteria for inoculating a final production medium, and (c) final fermentation by inoculating a final production medium with the culture resulting from stage (b), said final fermentation being the stage in which the principal proportion of said enzyme is formed, the improvement which comprises the step of providing in either stages (a) or (b), or in both stages (a) and (b), as a carbohydrate source, starch or a starch hydrolyzate having a D.E. less than 40, in an amount of ½–2% by weight based on the total weight of the medium used in said culture maintenance or inoculum development stages.

2. The method of claim 1 wherein said carbohydrate source is provided in both of said stages.

3. The method of claim 1 wherein the carbohydrate source is a low D.E. starch hydrolysate.

4. The method of claim 3 wherein said starch hydrolyzate has a D.E. of less than about 40.

5. The method of claim 4 wherein said D.E. falls within a range from about 5 to about 25.

6. The method of claim 1 wherein said carbohydrate source is present only in stage A.

7. The method of claim 1 wherein said carbohydrate source is present only in stage B.

8. The method of claim 6 wherein said carbohydrate source is starch.

9. The method of claim 8 wherein said starch is corn starch.

10. The method of claim 2 wherein said carbohydrate source present in stage A is starch.

11. The method of claim 10 wherein said starch is corn starch.

References Cited

UNITED STATES PATENTS

| 2,881,115 | 4/1959 | Liggett et al. | 195—66 R |
| 3,622,460 | 11/1971 | Masuda et al. | 195—66 R |
| 3,490,995 | 1/1970 | Wallenfels et al. | 195—66 R |
| 3,560,345 | 2/1971 | Yokobayashi et al. | 195—66 R |

OTHER REFERENCES

Ueda et al.: Production of Isoamylase by *Escherichia Intermedia*, Applied Microbiology, May 1967 (pp. 492–496).

Grant, J.: Hackh's Chemical Dictionary, 3rd ed., McGraw-Hill Book Co., Inc., New York, 1944 (p. 262).

Abdullah et al.: The Mechanism of Carbohydrase Action, Cereal Chemistry, January 1966, vol. 43 (pp. 111–117).

DAVID M. NAFF, Primary Examiner